United States Patent [19]

Barnes et al.

[11] Patent Number: 5,185,990

[45] Date of Patent: Feb. 16, 1993

[54] ROW FOLLOWER

[75] Inventors: Ronny L. Barnes; Bryan R. Barnes, both of O'Donnell, Tex.

[73] Assignee: Gar Bar Corporation (Texas Corporation), O'Donnell, Tex.

[21] Appl. No.: 814,767

[22] Filed: Dec. 30, 1991

[51] Int. Cl.⁵ ............................................ A01D 45/00
[52] U.S. Cl. ............................................ 56/51; 56/62
[58] Field of Search ............... 56/10.2, 13.5, 51–53, 56/62, 103; 104/244.1

[56] References Cited

U.S. PATENT DOCUMENTS 4,214,422  7/1980  McMillen ................................. 56/51
4,258,537  3/1981  Christman ............................... 56/51
4,999,983  3/1991  Britt et al. .......................... 56/62 X Primary Examiner—Thuy M. Bui
Attorney, Agent, or Firm—Wendell Coffee

[57] ABSTRACT

A pair of horizontal rods mounted to be very close to the ground run on either side of a row of stalks. The rods are mounted under harvesting equipment which would harvest the crop from the stalks. The rods are independently biased toward the row so that each of the rods contact and slide along the stalks. The rods are at least partially supported by pendants which hang from the harvesting equipment. The lateral movement of one of the pendants is measured to determine the deviation of the vehicle from the row.

7 Claims, 3 Drawing Sheets

ROW FOLLOWER

CROSS REFERENCE TO RELATED APPLICATION

None.

BACKGROUND OF THE INVENTION (1) Field of the Invention

This invention relates to a guidance system for agricultural land tractors and more particularly to that part of the system which senses the stalks along the rows which the tractor is to follow particularly in harvesting the crop. Farmers raising row crops are those having ordinary skill in the art.

(2) Description of the Related Art

Tractor guidance systems have been developed over a long period of time. This development shows that generally there are three elements to a guidance system for a tractor. These are broken down into (1) path sensors; (2) deviation detectors which measure the deviation as sensed by the sensor; and (3) steering means to guide the tractor responsive to the detected deviation. This particular patent relates to the path sensor.

There are many patents which relate to guiding a tractor along a furrow in the field. Examples of these would include BECK U.S. Pat. No. 4,407,716 and KNIGHT U.S. Pat. No. 1,868,360 who discloses what is believed to be basically a furrow follower. Although in a broad sense, "the path" means the line or row on the ground the tractor is to follow, in this particular application it is related only to a row of stalks.

Some of the stalk followers are called, wands, particularly if they are very light and are used to guide the tractor along a young crop wherein the stalk of the plants do not have sufficient maturity and strength to withstand greater pressures and force exerted against them.

Also, the applicants are aware of certain row followers used and mounted on harvesters, particularly one wherein a horseshoe like bracket is mounted above a stripper over one row of cotton and extends around the stripper to have a stalk feeler which runs along the stalks of cotton. The two elements feel the row, one of which feels one side of the row of cotton stalks and the other feels the other side of the row of cotton stalks. The two feeler elements are held together by the spring pressure of the horse shoe. The top or bight of the horseshoe is pivoted above the stripper mechanism. The rotational movement of the horseshoe about the pivot is used to indicate the deviation of the tractor and the row as described above. This horseshoe system would normally feel the row of stalks immediately beneath the stripper, which is to say that they would feel the stalks after the cotton bolls had been stripped from the stalk.

SUMMARY OF THE INVENTION (1) Progressive Contribution to the Art

This invention has a separate and independent feeler rod which feels or touches one side of a row of stalks and another separate and independent feeler rod which feels or touches the other side of the row of stalks. These two rods are mirror mates to each other. I.e., one is identical to the other except left-handed or right-handed thereof.

The main contact area with a stalk are elongated straight horizontal rods which are pressed against the stalk at ground level or slightly above ground level.

The row follower is particularly designed to run upon harvesting equipment and more particularly to a cotton harvester. On a cotton harvester, the front of the stripper will run very low. Normally the front of the stripper will have a skid so that the front of the stripper can skid along the earth. Each of the feeler rods is attached to the cotton stripper by a horizontal link to permit lateral movement of the front. The rear of the row follower or rod is supported by a pendant which is pivoted at its upper-most part to the bottom side of the stripper. The rear of the stripper will be elevated above the front so there is ample clearance for the pendant to be pivoted. A spring extends between each of the pendants and the bottom of the stripper to pull the row followers toward one another to clamp the stalks between them.

In stripping cotton, the cotton stalk is run between two rotating rollers which have brushes or flaps thereon which take the bolls off of the stalk of cotton. For best operation, the stalks of cotton should pass immediately between the two rotating rollers. Deviation from this path as much as one quarter of an inch ($\frac{1}{4}$") results in an inferior harvesting operation. A deviation of more than a fraction of an inch will result in some of the cotton being knocked free of the stalk and not being caught and collected to be conveyed to a basket. Instead, it will be thrown upon the ground.

Obviously if the tractor is to be guided mechanically, it can be guided no more accurately than the row follower is capable of following exactly a row of stalks.

Sometimes there is a blank in the row of stalks because of faulty planting or cultivation. Normally this will occur only in one row and the adjacent row will not be blank. In the event of a one-row blank, it is highly desirable that the guidance system use the adjacent row as a guide. This is possible by placing row followers on adjacent rows and connecting the pendants together with a stiff leg.

(2) Objects of this Invention

An object of this invention is to move a land vehicle along a row of agricultural crops.

Other objects of this invention are to feel a row of stalks so that the lateral deviation between the vehicle and the row may be detected.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

The specific nature of the invention, as well as other objects, uses, and advantages thereof, will clearly appear from the following description and from the accompanying drawings, the different views of which are not necessarily scale drawings.

Figure 1:
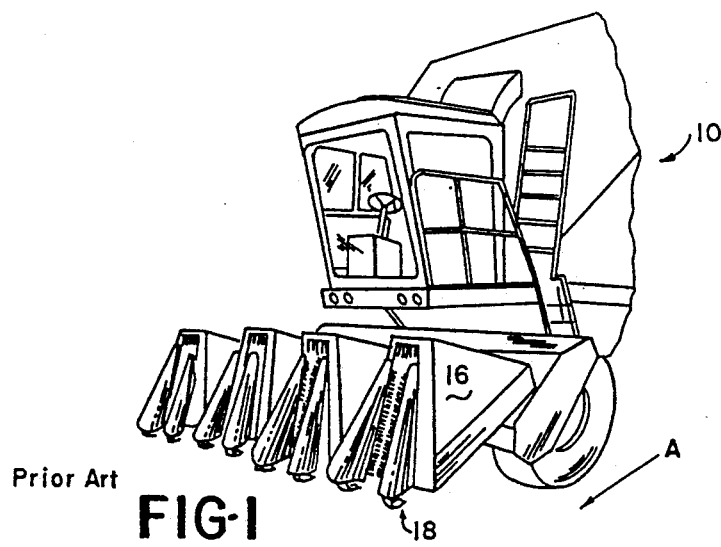
FIG. 1 is a front elevational view of an agricultural tractor with a cotton stripper mounted thereon.
Figure 2:
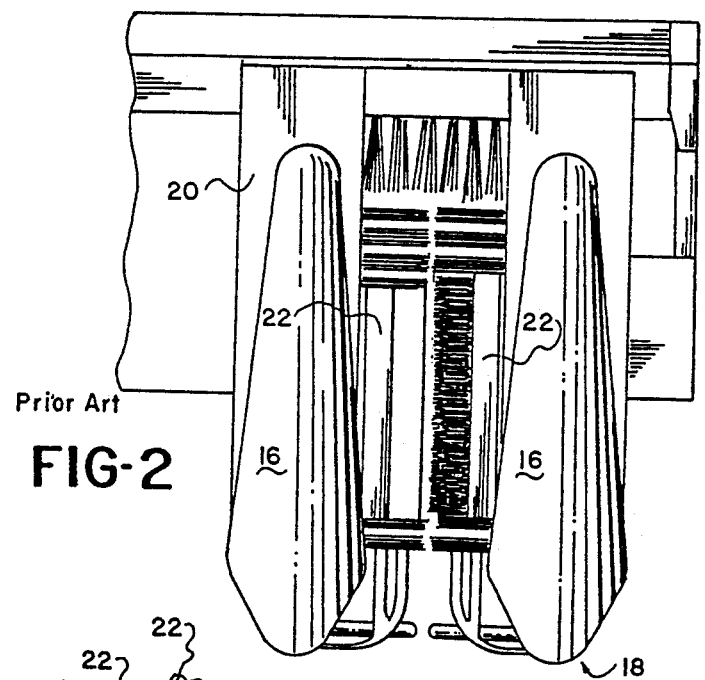
FIG. 2 is a front elevational view of a single harvesting unit of a cotton stripper with some parts broken away for clarity.
Figure 3:
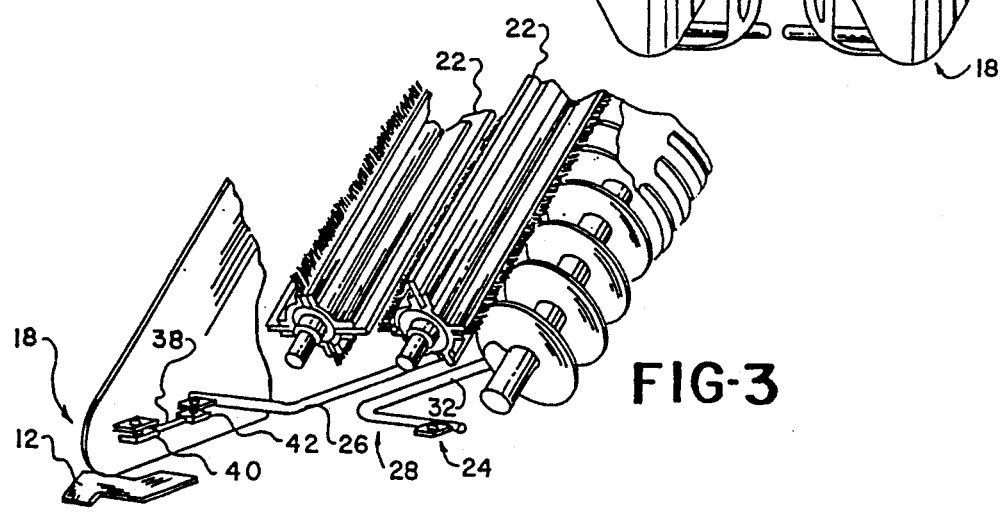
FIG. 3 is a perspective view of the front of an unit of agricultural cotton stripper with the protective coverings and other parts broken away to see details of construction of the invention in connection with the stripper unit.
Figure 4:
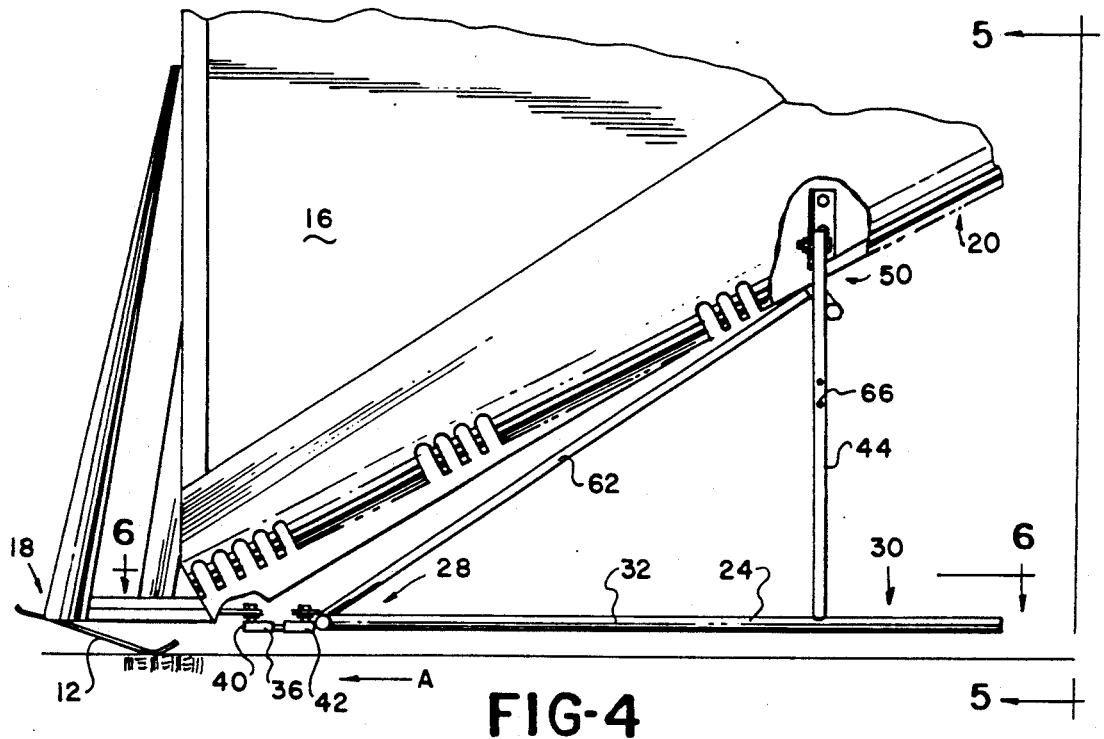
FIG. 4 is a side elevational view of a stripper with the row follower according to this invention attached. The stripper is shown somewhat schematically.

As an aid to correlating the terms of the claims to the exemplary drawing(s), the following catalog of elements and steps is provided:

| 10 | tractor | 50 | upper part (of pendant) |
|----|---------|----|------------------------|
| 12 | skid | 51 | pivot |
| 14 | stalks | 52 | clip |
| 16 | harvester unit | 54 | spring |
| 18 | front (of harvester) | 56 | bell crank |
| 20 | rear (of harvester) | 58 | arm (of encoder) |
| 22 | stripping elements | 60 | transmitter |
| 24 | first rod | 62 | first brace |
| 26 | second rod | 64 | second brace |
| 28 | front (of rod) | 66 | stiff leg |
| 30 | rear (of rod) | A | Travel Arrow |
| 32 | straight portion | B | Normal Arrow |
| 34 | throat | | |
| 36 | first link | | |
| 38 | second link | | |
| 40 | leading end | | |
| 42 | trailing end | | |
| 44 | first support pendant | | |
| 46 | second support pendant | | |
| 48 | lower part (of pendant) | | |

DESCRIPTION OF THE PREFERRED EMBODIMENTS

Referring to the drawings, there may be seen an agricultural land vehicle in the form of tractor 10 in a field. As illustrated, the tractor will have harvesting equipment in the form of a cotton stripper thereon having four stripper units 16 in the form of heads. Each stripper head will follow one row of stalks 14 (FIG. 5) to harvest the crop. In the case of cotton, of course, the crop would be the bolls of cotton. In the event the crop was some other crop such as corn, the crop to be harvested would be ears of corn and the harvesting unit would be a corn harvester.

The harvester unit 16 will have front 18 which operates close to the ground. As noted skid 12 prevents the harvester unit from digging into the ground. The harvesting unit will angle upward from the front 18 so that there is rear 20 which is elevated above the ground.

For efficient harvesting it is desirable to operate the harvesting unit so that stripping elements 22 are in an exact relationship to the rows of stalks 14.

The tractor will move along the row of stalks and therefore have a direction of travel indicated by arrow A.

Those with ordinary skill in the art will understand that the equipment described to this point is old and well known to the art.

This invention relates to an improved structure to feel or touch the row of stalks 14 to aid in guiding them by locating the relationship between the row and the harvesting unit.

The structure according to this invention includes first rod 24 and second rod 26 mounted as a pair. Each rod will have front 28 and rear 30. The rods 24 and 26 are mirror mates to each other. I.e., rod 24 is a mirror mate to rod 26 and rod 26 is a mirror mate to rod 24. Each rod will have straight trailing portion 32 which is parallel to and proximate of the like straight trailing portion 32 of its mate. Each rod 24 and 26 is curved outward in a horizontal direction at the front 28 thereof. The pair of rods therefore will have throat 34 between the outward curved portions at the front 28. This outward curved portion will serve to guide the pair along the row of stalks with one rod 24 on one side of the row of stalks 14 and the other rod 26 on the other side of the row of stalks.

By mirror mates, it is meant that the two elements are identical except one being a right-hand part and the other being a left-hand part.

First link 36 is pivoted to the front of first rod 24. Second link 38 is pivoted to the front 28 of second rod 26. Each of the links 36 and 38 have leading end 40 and trailing end 42. It is the trailing end 42 of each link that is connected to the front 28 of the rods. The leading end 40 of each of the links 36 and 38 is pivoted to a part of the agricultural vehicle, specifically the front 18 of the harvesting unit. Each link will be horizontal. I.e., the extreme front portion 28 of each of the rods 24 and 26 will be on the same level as the front 18 of the harvester 16 where the pivot connection is made. Inasmuch as the front 18 of the harvesting unit 16 is near or rides on skid 12 along the ground, therefore the rods 24 and 26 will also be very near or ride along the ground. The links 36 and 38 will be short in comparison with the links of the rods 24 and 26. Normally the links will be no more than about 1/5 of the length of the rods.

Figure 5:
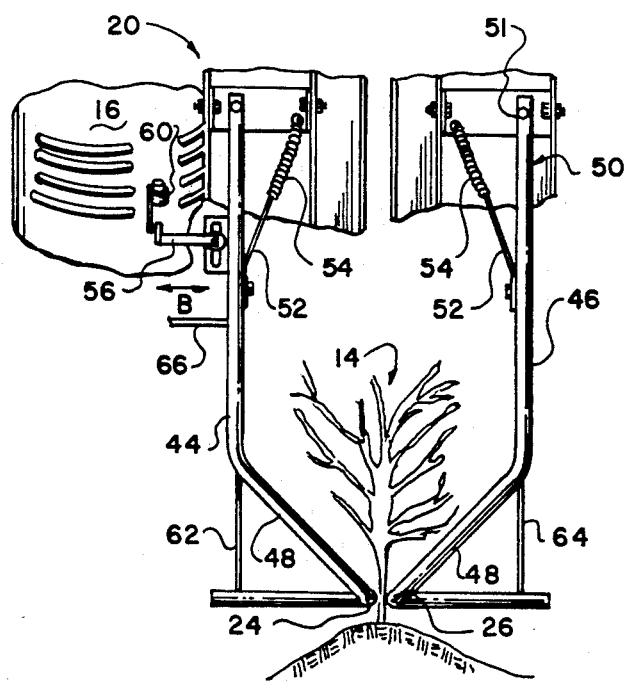
FIG. 5 is an elevational view taken substantially along line 5—5 of FIG. 4.
Figure 6:
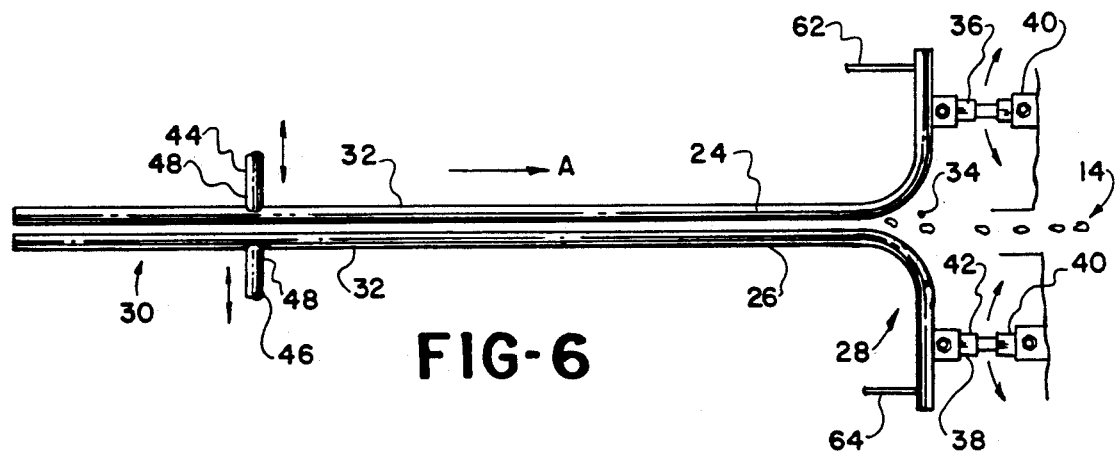
FIG. 6 is a sectional plan view taken along line 6—6 of FIG. 4.
Figure 7:
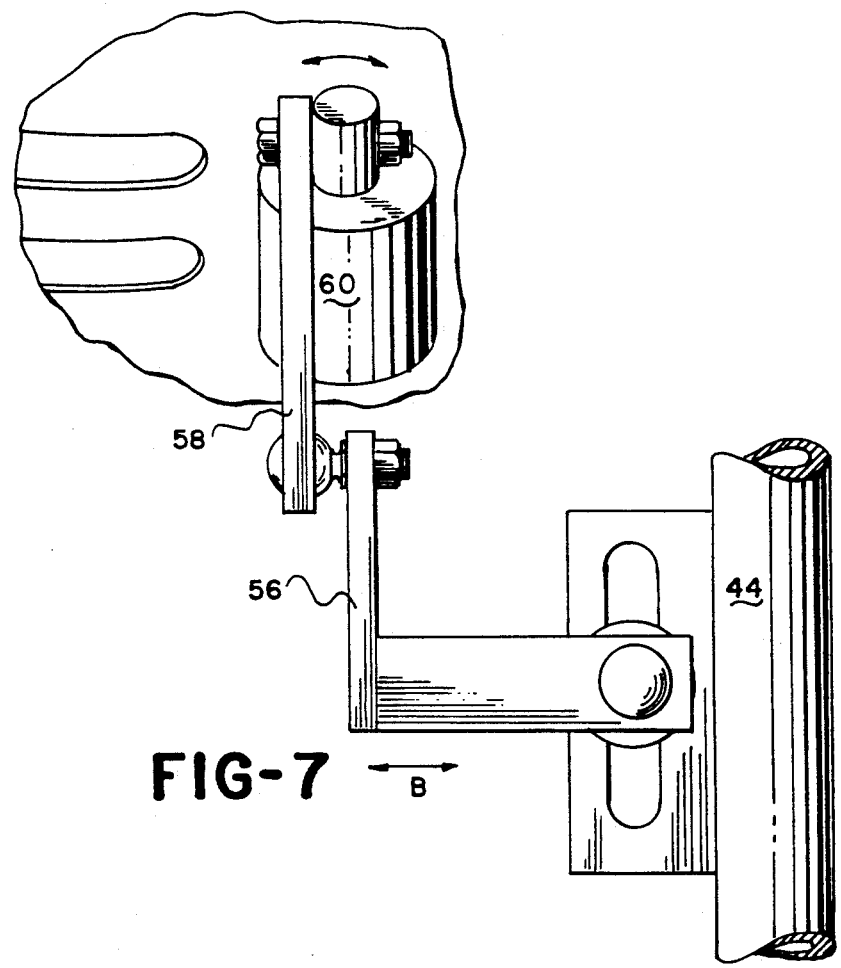
FIG. 7 is a perspective view of a portion of the detecting means inner-connecting one of the pendants and the agricultural vehicle.

First support pendant 44 is attached near the rear 30 of the straight trailing portion 32 of the first rod 24. Second support pendant 46 is attached near the rear 30 of the straight trailing portion 32 of the second rod 26. Each of the pendants, at its lower part 48 is angled away from its mate so that it is spaced away from the row 14 of stalks (FIG. 5). It will be understood that just as the rods 24 and 26 are mates, that also the links 36 and 38 will be mirror mates and the support pendants 44 and 46 will be mirror mates.

The angling away of the pendants 44 and 46 is desirable inasmuch as the cotton stalk 14 will have branches thereon. The pendant angling away from the rod will prevent undue interference of the branches with the pendant and rods. (FIG. 5)

Upper part 50 of each pendant 44 and 46 is pivoted to said agricultural vehicle. I.e., the upper part 50 of the first support pendant 44 is pivoted to the rear 20 of the harvester unit 16. Likewise the upper part 50 of the second support pendant 46 is pivoted at pivot 51 at its upper portion to the rear 20 of the harvester unit 16.

The pivots of the pendants to the harvester unit are such that the pendants can move as shown by arrow B in a plane which is normal or transverse of the direction of travel of the tractor as shown by arrow A.

Clip 52 is attached to each of the pendants 44 and 46 at about the mid-point thereof. Helical tension spring 54 extends from the clip to the harvesting unit 16. The spring 54 is attached to the harvesting unit inboard of the pivot 51. Therefore, the spring 54 forms a bias means interconnecting each of the pendants 44 and 46 to the agricultural vehicle in the form of the tractor 10 by the harvesting unit 16 to urge each pendant 44 and 46 and the rods 24 and 26 toward its mate. If there is no intervening stalks or other objects between the trailing portions 32 of the rods 24 and 26, the trailing portions of the rods will be in contact with one another and held in such position by the springs 54. However, in operation, as the tractor goes down the row of stalks the stalks will be between the two rods. If the tractor 10 is not following the row exactly, the stalks will cause the rods to deviate either to the right or to the left, thereby indicating that the tractor is not correctly aligned with the row of stalks.

Bell crank 56 is connected to the pendant at about the clip 52 or slightly thereabove. The pitman extends to arm 58 of transmitter 60 which is attached to the harvesting unit 16. As the pendant 44 Arrow B moves in response to deviation, the movement is transferred by the pitman 56 and arm 58 to the transmitter 60 whereby the transmitter then produces a signal response indicating the deviation.

Those having ordinary skill in the art will understand that the transmitter 60 could produce an electrical, hydraulic mechanical or other signal which could be used to also indicate deviation of the pendant 44. It will be understood that the arm 58, pitman 56, and transmitter 60, are a portion of a detecting means interconnecting the pendant 44 and the agricultural vehicle 10 to detect the movement Arrow B normal to the direction of travel indicated by arrow A.

First brace 62 extends from the front 28 of the first rod 24 to the upper part 50 of the first support pendant 44 to add rigidity to the arm and pendant structure. Likewise, second brace 64 extends from the front 28 of the second rod 26 to the upper part 50 of the second support pendant 46 to add rigidity to the arm and pendant structure.

It will be understood that the agricultural vehicle in the form of tractor 10 usually has at least two harvesting units 16. Also it will be understood that two of the structures to feel the row crop could be used, one of said structures attached to each of the adjacent harvesting units 16. It will be understood that there would be a right pendant of the left harvesting unit 16 adjacent to a left pendant of the right harvesting unit 16, and therefore these two pendants would be adjacent. Also, it will be understood that if the row of stalks results from a row of seed planted by two planters upon the same tool bar attached to a tractor, that the two rows of stalks should always have the exact same spacing one from the other. Therefore, stiff leg 66 could be connected from one adjacent pendant to the other and the two pendants should operate in unison under all normal circumstances. However, in certain adverse conditions, there may be a skip or a vacant place in one row of stalks where no stalks occurred. In such an event, there would be nothing to indicate whether the tractor had deviated from its prescribed path because of the absence of stalks in the row. However, if the two pendants were connected by a stiff leg and one of the pendants so connected had the pitman 56 attached thereto to operate the transmitter 60, if one or the other row had stalks therein the tractor 10 would still be guided in its prescribed path.

Therefore it will be understood that the row follower as described above will follow the row of stalks and it will follow the row of stalks as immediately adjacent to the ground even during the time that the crop upon the stalks is being harvested. I.e., even as the harvesting unit 16 is stripping the bolls of cotton from the cotton plant the straight trailing portions 32 will be guiding themselves along the stalks adjacent to the ground so that the tractor follows the row accurately.

The embodiment shown and described above is only exemplary. We do not claim to have invented all the parts, elements or steps described. Various modifications can be made in the construction, material, arrangement, and operation, and still be within the scope of our invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as our invention:

1. Structure to touch a row of stalks so that an agricultural vehicle having a direction of travel may be located thereto and guided therealong comprising:
    a. a pair of elongated horizontally oriented rods extending along said direction of travel, each rod:
        i. having a front and rear,
        ii. being a mirror mate to the other rod,
        iii. having a straight trailing portion parallel to and proximate of the like portion of its mate, and
        iv. curving outward in a horizontal direction at the front thereof,
        v. so that the pair form a throat at the front which guides the pair of rods along the row of stalks with one of the rods on each side of the stalks,
    b. a link having a leading end and a trailing end for each rod,
    c. the front of each of the rods pivoted to the trailing end of its link and
    d. the leading end of each of the links pivoted to a part of the agricultural vehicle,
    e. a support pendant with a lower portion attached near the rear of the trailing portion of each of the rods, and with an upper portion pivoted to said agricultural vehicle,
    f. bias means interconnecting each of the pendants and the agricultural vehicle to urge each pendant and its attached rod toward its mate, and
    g. detecting means interconnecting one of the pendants and the agricultural vehicle to detect the movement normal to the direction of travel of that pendant.

2. The invention as defined in claim 1 further comprising:
    h. a brace extending from the forward portion of each rod to the upper part of each pendant.

3. The invention as defined in claim 1 further comprising:
    h. each of said pendants angled away from its mate at its lower part connected to its rod so that it is spaced away from the row of stalks.

4. The invention as defined in claim 1 further comprising:
    h. said agricultural vehicle having at least one unit of harvesting equipment for harvesting the crop from each row of stalks,
    j. said harvesting equipment operating close to the ground at the front thereof and upward to the rear,
    k. said links pivoted to the front of the harvesting equipment, and
    l. said pendants pivoted to the rear of the harvesting equipment.

5. The invention as defined in claim 4 wherein m. said harvesting equipment is a cotton stripper and said rods extend along a row of cotton stalks after the crop has been harvested therefrom.

6. The invention as defined in claim 4 wherein
   m. there are at least two adjacent units of harvesting equipment,
   n. two of said structures to touch a row, one each attached to adjacent units, and
   o. a stiff leg connecting one of said pendants of one structure to an adjacent pendant of another structure so that the pendants connected by the stiff leg move in concert.

7. Structure to touch a row of stalks so that an agricultural vehicle having a direction of travel may be located thereto and guided therealong comprising:
   a. a first elongated horizontal oriented rod,
   b. a second elongated horizontal oriented rod, said rods forming a pair,
   bb. each rod being a mirror mate to the other rod, and:
      i. having a front and rear,
      ii. having a straight trailing portion parallel to the direction of travel and proximate of the like portion of its mate, and
      iii. curving outward in a horizontal direction at the front thereof,
      iv. so that the pair form a throat at the front which guides the pair along the rows of the stalk with the first rod on one side of the stalks and the second rod on the other side of said stalks,
   c. a first link having a leading end and a trailing end,
      i. the front of the first rod pivoted to the trailing end of the first link, and
      ii. the leading end of the first link pivoted to a part of the agricultural vehicle,
   d. a second link having a leading end and a trailing end,
      i. the front of the second rod pivoted to the trailing end of the second link, and
      ii. the leading end of the second link pivoted to a part of the agricultural vehicle,
   e. a first support pendant with a lower portion attached near the rear of the trailing portion of the first rod and with an upper portion pivoted to said agricultural vehicle,
   f. a second support pendant with a lower portion attached near the rear of the trailing portion of the second rod and with the other upper portion pivoted to said agricultural vehicle,
   ff. said pendants being mirror mates,
   g. a first bias means interconnecting the first pendant and the agricultural vehicle to urge the first pendant and the first rod toward the second pendant and rod, and
   h. a second bias means interconnecting the second pendant and the agricultural vehicle to urge the second pendant and the second rod toward the first pendant and rod, and
   j. detecting means interconnecting the first pendant and the agricultural vehicle to detect the movement of the first pendant normal to the direction of travel.

* * * * *